Aug. 12, 1958  R. G. DAY ET AL  2,847,628
SYNCHRONIZING SYSTEM
Filed Nov. 18, 1954
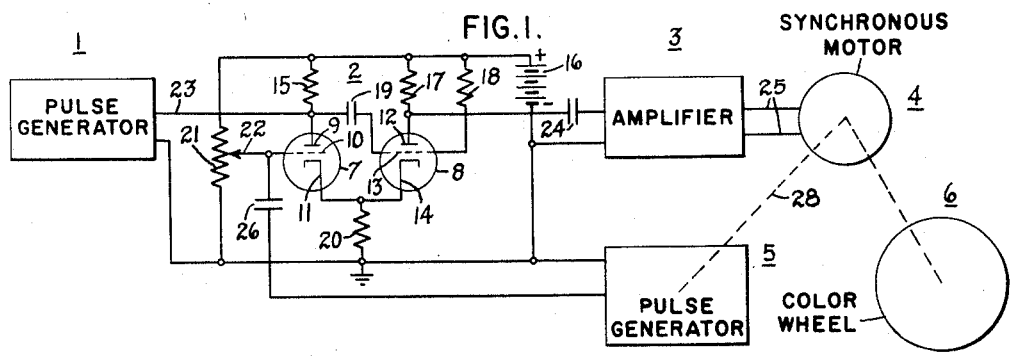
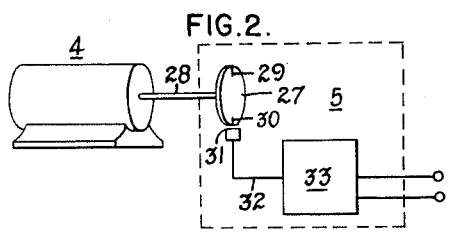
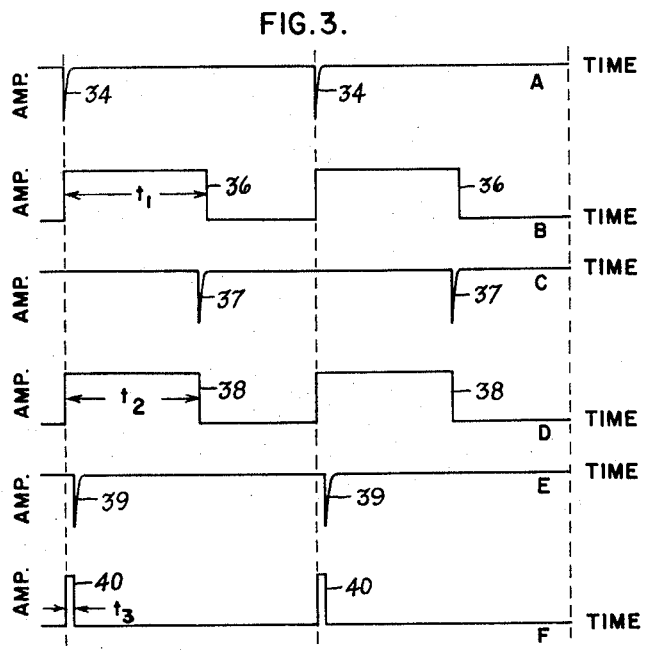
INVENTORS:
ROBERT G. DAY,
LAURANCE M. LEEDS,
BY *Julius J. Zaskalicky*
HIS ATTORNEY.

United States Patent Office 2,847,628
Patented Aug. 12, 1958

2,847,628

SYNCHRONIZING SYSTEM

Robert G. Day, Constantia, and Laurance M. Leeds, Syracuse, N. Y., assignors to General Electric Company, a corporation of New York Application November 18, 1954, Serial No. 469,716

9 Claims. (Cl. 318—175)

This invention generally relates to synchronizing systems and more particularly to a synchronizing system for controlling the phase of rotation of a synchronous motor with respect to an applied alternating voltage.

In a field sequential color television system wherein is employed a synchronous motor to rotate a color wheel, it is necessary that the color wheel synchronize in a predetermined angular position relative to the color synchronizing pulses of the system. Since the rotor of a synchronous motor to which the color wheel is attached may synchronize in as many different positions as the stator has poles, and since in the present application it is necessary that the color wheel synchronize in only one-half of these positions, means must be provided for properly phasing the motor. The problem of properly phasing a motor also arises in other applications.

It is, therefore, an object of this invention to provide new and improved means for phasing the rotor of a synchronous motor with respect to an applied alternating voltage or to synchronizing pulses.

Another object of this invention is to provide new and improved means for controlling the position in which the rotor of a synchronous motor synchronizes.

A further object of this invention is to provide in a color television system new and improved means for synchronizing the position of a color wheel with respect to color synchronizing pulses.

In carrying out the present invention as applied to apparatus for synchronizing the motion of a synchronous motor with respect to a synchronizing signal, means are provided for obtaining a series of periodically recurring pulses and for applying these pulses to the synchronous motor to cause periodic rotation thereof in synchronism with the frequency of synchronizing pulses. Means are further provided responsive to the phase of rotation of the motor for controlling the duration of the pulses and thereby controlling the angle of synchronization of the synchronous motor.

For further objects and advantages and for a better understanding of this invention, attention is now directed to the following description and accompanying drawings and to the appended claims wherein those features of novelty which constitute the invention are pointed out with particularity.

In the drawing,

Fig. 1 is a schematic diagram of a preferred embodiment of the invention;

Fig. 2 is a schematic diagram of a pulse generating means which may be employed in conjunction with the invention; and Fig. 3 shows a plurality of waveforms used to facilitate an understanding of the invention.

Referring to Fig. 1, there is shown a pulse generator 1 which is a source of color synchronizing pulses, a multivibrator 2 which functions as a pulse oscillation wave generator, an amplifier 3, a synchronous motor 4, a pulse generator 5, and a color wheel 6.

Multivibrator 2 produces a train of pulses in response to the train of color synchronizing pulses supplied thereto from pulse generator 1. The train of pulses so produced is amplified by amplifier 3 and supplied to the stator terminals of the synchronous motor 4 which rotates the color wheel 6. Pulse generator 5 is arranged to release pulses of energy in time correspondence to the phase of rotation of the rotor of synchronous motor 4, and these pulses are employed to control the length of the pulses produced in the multivibrator 2. When the phase of rotation or angle of synchronization of the rotor is proper, the pulses from the pulse generator 5 are phased with respect to the color synchronizing pulses of pulse generator 1 such that the oscillation wave from the multivibrator 2 approximates a square wave. When, however, the phase of rotation of the rotor is improper, the pulses from the pulse generator 5 are so phased with respect to the color synchronizing pulses as to develop an oscillation wave at the output terminals of the multivibrator 2 which constitutes a train of narrow pulses. When the latter wave is amplified and supplied to the synchronous motor 4, the rotor falls out of synchronism, whereas when the former wave is amplified and supplied to the synchronous motor 4, the rotor remains in synchronism. Thus, the rotor is automatically made to synchronize with the color synchronizing pulses.

Referring now to the circuit of Fig. 1 in greater detail, multivibrator 2 comprises a pair of electron discharge devices 7 and 8. Electron discharge device 7 is provided with an anode 9, a control electrode 10 and a cathode 11. Electron discharge device 8 is provided with an anode 12, a control electrode 13 and a cathode 14. An anode resistor 15 is connected between anode 9 and the positive terminal of a source of direct potential illustrated in the drawing as a battery 16. An anode resistor 17 is connected between anode 12 and the positive terminal of battery 16. A resistor 18 is connected between the positive terminal of battery 16 and control electrode 13, and a capacitor 19 is connected between anode 9 and control electrode 13. A cathode resistor 20 is connected between cathodes 11 and 14, and ground. A potentiometer 21 has the outer terminals thereof connected respectively to the positive terminal of battery 16 and to ground, and a variable tap 22 located thereon is connected to control electrode 10 of electron discharge device 7. One output terminal of pulse generator 1, one output terminal of pulse generator 5 and an input terminal of amplifier 3 are connected to ground.

Color synchronizing signals from pulse generator 1 are coupled through a conductor 23 to anode 9. The output of multivibrator 2 is taken off the anode 12 and coupled through a capacitor 24 to the input of amplifier 3. The output of amplifier 3 is coupled by means of conductors 25 to the stator terminals of synchronous motor 4. The rotor of synchronous motor 4 is mechanically coupled to pulse generator 5 and also to color wheel 6. The electrical output of pulse generator 5 is coupled through a capacitor 26 to control electrode 10 of electron discharge device 7.

Multivibrator 2 in a preferred embodiment of the invention is a one-shot multivibrator wherein electron discharge device 7 is normally nonconducting. The synchronizing pulses from pulse generator 1 are of negative polarity such that when coupled through capacitor 19 to control electrode 13, electron discharge device 8 is rendered nonconductive and thereby reduces the potential of cathode 11 to ground such that electron discharge device 7 becomes conductive. As is well known in the art, the time during which electron discharge device 8 remains nonconductive can be varied by the variation of the position of tap 22 on potentiometer 21, or by variation of the value of resistor 18, the capacitor 19, or the positive potential to which resistor 18 is connected.

Therefore, after a predetermined length of time, electron discharge device 8 becomes conductive again thereby causing an increased current flow through resistor 20 and a rise in the potential of the cathode 11 which cuts off conduction in electron discharge device 7. Anode 12 is approximately at the source potential during that period when electron discharge device 8 is cut off and drops by an amount equal to the voltage drop across anode resistor 17 when electron discharge device 8 becomes conductive. By a proper positioning of tap 22 on potentiometer 21, the pulses which appear at anode 12 and which are amplified in the amplifier 3 may be used to drive synchronous motor 4.

It is desirable that amplifier 3 include elements which cause the output thereof to approximate a sine wave. In a practical application, however, it would be unusual to provide an amplifier and motor which would not round off the corners of the waveform supplied to the motor such that the output would approximate a sine wave. Conventional amplifiers attenuate the higher frequency components of a pulse wave thereby causing rounding of the corners of the pulse wave.

To facilitate an understanding of the operation of the invention, let it be assumed that the stator of synchronous motor 4 has four poles but that it is desired that the rotor synchronize only at every other pole such that there are two possible satisfactory phases of rotation and two possible unsatisfactory phases of rotation. This condition will generally exist when a synchronous motor is utilized to drive the color wheel in a sequential color television system or the like.

Referring to Fig. 2, there is shown a pulse generator 5 driven by synchronous motor 4. In this embodiment of a pulse generator, a synchronizing disc 27 is provided on the rotor shaft 28 of synchronous motor 4 and rotates therewith. It will be understood that synchronizing disc 27 need not be directly connected to rotor shaft 28 but may be connected by means of a plurality of gears such that the speed of rotation of synchronizing disc 27 is not coincident with the speed of rotation of the rotor. In this particular arrangement, because the synchronous motor 4 has four poles, synchronizing disc 27 has symmetrically provided along the periphery thereof, two magnetic chips 29 and 30. A magnetic pickup device 31 is located in close proximity to the periphery of the synchronizing disc 27 and the output thereof is connected through a conductor 32 to a conventional pulse amplifier 33. The output of pulse amplifier 33 is coupled through capacitor 26 (Fig. 1) to control electrode 10 of electron discharge device 7. It will be seen, therefore, that each time a magnetic chip passes magnetic pickup device 31, a pulse will be generated therein which is amplified in pulse amplifier 33 and is supplied to electron discharge device 7.

Since it was assumed that synchronous motor 4 had four stator poles, two magnetic chips are provided. Generically, however, the number of chips provided is equal to N/2 where N is the number of poles. Furthermore, if the synchronizing disc 27 is geared to the synchronous motor 4 rather than directly connected to the shaft thereof, the number of chips provided is equal to NR/2 wherein R is the ratio of the speed of rotation of the rotor to the speed of rotation of synchronizing disc 27. Other methods for obtaining information indicative of the angular position of the rotor of synchronous rotor 4 may be employed. Such methods might include providing a plurality of extending portions on the synchronizing disc 27 and employing a contactor to complete an electric circuit upon the touching thereof by the extensions. In such a case, the number of extensions would be determined in the same way as are the number of magnetic ships provided in the embodiment of Fig. 2. Another method might be use of a photocell pickup device and plurality of slits or other discontinuities on the synchronizing disc 27.

Referring to Fig. 3, there are shown a plurality of graphs of amplitude versus time illustrative of the signals appearing at various points in the system of Fig. 1. Graph A shows the output of pulse generator 1 which includes a plurality of negative spikes 34 which are the color synchronizing pulses. In response to the negative spikes 34 and in the absence of pulses from pulse generator 5, a signal having a plurality of positive pulses 36 (graph B) is developed at anode 12 of electron discharge device 8. It will be noted that the leading edges of the positive pulses 36 in graph B correspond to the leading edges of the negative spikes 34 in graph A. The trailing edges, which follow the leading edges by a time $t_1$, have a location determined by the setting of variable tap 22 on potentiometer 21. If the rotor of synchronous motor 4 synchronizes at one of the desired positions, magnetic chips 29 and 30 will effect an output wave of the kind shown in graph C from pickup device 31. This wave includes a plurality of negative spikes 37.

Because there are one-half as many chips as there are stator poles, if no gearing is used, and since there is one cycle of energy supplied to the synchronous motor 4 for each negative spike 34, there will be one pulse generated in magnetic pickup device 31 for each negative spike 34. Furthermore, since the chips 29 and 30 are symmetrically located on the periphery of the synchronizing disc 27, if the speed of rotation of the synchronous motor 4 is constant, the pulses generated in pickup device 31 are regularly spaced in time. The absolute positions of these pulses are dependent upon the relative positions of the magnetic chips 29 and 30 and the magnetic pickup device 31. In a practical application of this invention the position of the magnetic pickup device 31 is adjustable, but once the pickup device 31 has been properly positioned, it need not again be moved unless the synchronizing disc 27 or the color wheel 6 is rotated relative to the motor shaft. Magnetic pickup device 31 is mounted on a radius arm whose center of rotation is the same as the center of the synchronizing disc shaft. Magnetic pickup device 31 is positioned properly by moving the radius arm while observing the waveform at anode 12 of electron discharge device 8 with an oscilloscope until a waveform similar to that of graph D in Fig. 3 indicating proper operation is observed.

When a negative spike 37 from pulse generator 5 is coupled to control electrode 10, electron discharge device 7 is rendered nonconductive causing the potential of anode 9 to increase to the potential of the positive terminal of battery 16 which in turn raises the potential of control electrode 13 to cause electron discharge device 8 to be rendered conductive. The positive pulse from the multivibrator 2 is thereby terminated. Graph D comprises a plurality of positive pulses 38 which have a time duration $t_2$ which is somewhat less than the duration of positive pulses 36 (graph B) which would be provided by the multivibrator 2 in the absence of the feedback signal from pulse generator 5. Thus, the trailing edges of those pulses correspond in time to the negative spikes 37 from pulse generator 5.

If the rotor of the synchronous motor 4 synchronizes at one of the undesirable poles, pulse generator 5 produces pulses which are in such a time phase as to closely follow or be in synchronism with the color synchronizing pulses shown as negative spikes 39 in graph E of Fig. 3. Thus, an output having the wave form of graph F appears at anode 12 of electron discharge device 8. Graph F shows a plurality of narrow positive pulses 40 which have a time duration of $t_3$, which it will be observed is appreciably shorter than the time duration of the positive pulses 38 (graph D) appearing at anode 12 when the angle of synchronization of the rotor of synchronous motor 4 with respect to the negative spikes 34 is proper.

The waveform of graph F contains a fundamental frequency component of much lower amplitude than does the waveform of graph D and approaches zero as negative spike 34 (graph A) and negative spoke 39 (graph E) approach time correspondence. The amplitude of voltage of the fundamental component of frequency in Graph F is insufficient to hold synchronous motor 4 in synchronism since insufficient power is thus transmitted to the synchronous motor 4 at the color synchronizing pulse repetition frequency of pulse generator 1. The power to the synchronous motor 4 falls off such that the synchronous motor 4 drops out of synchronism. During the period when the synchronous motor 4 falls out of synchronism, the pulses from pulse generator 5 have a time sequence causing the pulse width in the output wavefrom of the multivibrator 2 to increase. This results in an increase in power to the synchronous motor 4 which causes it to again pull into synchronism. During this period, however, the rotor has slipped one pole to the desired angle of synchronization.

Once synchronous motor 4 has been brought into synchronism, it is possible to disconnect the output of pulse generator 5 from multivibrator 2 so that the frequency of the multivibrator 2 is synchronized to the frequency of pulse generator 1 to control the rotation of synchronous motor 4. In such an arrangement, the position of variable tap 22 on potentiometer 21 is adjusted such that the positive pulses appearing at anode 12 have a time duration of approximately $t_2$ as shown in graph D of Fig. 3. By using the pulses from pulse generator 5 to continually control the commutation time of multivibrator 2, however, changes in the frequency of the multivibrator 2 which may be caused by tube aging, heating, etc., do not affect the synchronous operation of the color wheel 6.

While this invention has been described in relation to a particular embodiment thereof, it will be understood that those skilled in the art may make many changes and modifications without departing from the invention. Therefore, the appended claims are intended to cover all such changes and modifications which fall within the true spirit and scope of this invention.

What we claim is new and desire to secure by Letters Patent of the United States is:

1. In combination, a source of synchronizing pulses, a pulse generator for developing pulses, means for applying said synchronizing pulses to said pulse generator, said pulse generator having means responsive to another series of pulses for controlling the length of pulses generated therefrom, a synchronous motor, means for applying the output of said pulse generator to said synchronous motor for driving said motor in synchronism with said source of synchronizing pulses, means for deriving another series of pulses in constant phase relationship with the rotation of said synchronous motor, means for applying said other series of pulses to said length controlling means of said pulse generator, whereby the phase of rotation of said synchronous motor is automatically synchronized with said source of synchronizing pulses.

2. In combination, a synchronous motor, a source of regularly occurring synchronizing pulses, a pulse generator connected to said source for generating pulses each having a leading edge in time correspondence with a respective synchronizing pulse, means connecting the output of said generator to drive said motor in synchronism with said pulses, means for generating another series of pulses in constant phase relationship with the rotation of said motor, and means responsive to said last series of pulses for controlling the time occurrence of the trailing edges of the pulses produced by said pulse generator with respect to the leading edges thereof.

3. In combination, means for obtaining a series of periodically recurring pulses of variable duration, a synchronous motor responsive to said pulses to rotate in synchronism with the frequency of said pulses, means for detecting the phase of rotation of said motor, means responsive to one phase of rotation of said motor for causing each of said pulses to be of one duration and responsive to another phase of rotation of said motor for causing each of said pulses to be of another duration substantially longer than said first duration, the duration of said pulses being such that said motor falls out of synchronism for pulses of said one duration and maintains synchronism for pulses of said other duration.

4. In combination, a synchronous motor, a source of regularly occurring synchronizing pulses connected in circuit therewith to cause rotation thereof in synchronism with said pulses, control means connected to said source for controlling the duration of said pulses, means for deriving a voltage wave having a phase with respect to the phase of said pulses which varies with the angle of synchronization of said motor, means for applying said wave to said control means to control the duration of said pulses, whereby said motor is maintained in synchronism with said synchronizing pulses.

5. In combination, means for obtaining a series of periodically recurring pulses of predetermined duration, a synchronous motor, means for applying said pulses to said motor to cause periodic rotation thereof in synchronism with the frequency of said pulses, means for detecting a change in phase of rotation of said motor, and means responsive to said last-named means for changing the duration of said pulses in a direction to maintain said motor in synchronism with said periodically recurring pulses, whereby said motor is automatically synchronized with said pulses.

6. In combination, a synchronous motor, a source of regularly occurring synchronizing pulses, a pulse generator connected to said source for generating pulses, each having a leading edge in time correspondence with a respective synchronizing pulse, means connecting the output pulses of said generator to drive said motor in time correspondence therewith, means connected to said motor for developing a group of pulses for each rotation of said motor, each of the pulses of said group corresponding to a different predetermined angular position of the rotor of said motor, said repetitive group of pulses forming a train of pulses, each pulse of said train occurring with regularity and having the same periodicity as said synchronizing pulses, means responsive to each said pulse of said train for initiating the trailing edge of a corresponding output pulse from said generator.

7. In combination, means for obtaining a wave having a predetermined period, a synchronous motor responsive to said wave to rotate in synchronism with the periodicity of said wave, means for varying the duration of a portion of said wave to vary the phase of rotation of said motor with respect to said wave, and means responsive to the phase of rotation of said motor for controlling the duration of said portion of said wave whereby the rotor of said motor is automatically phased with respect to said wave.

8. In combination, means for obtaining a first series of periodically recurring pulses, a synchronous motor responsive to said first series of pulses to rotate in synchronism with the frequency of said pulses, a pulse generator associated with said motor for generating another series of pulses, and means responsive to said other series of pulses for controlling the duration of each pulse of said first series of pulses.

9. In combination, a synchronous motor, a source of alternating voltage connected in circuit therewith to cause rotation thereof in synchronism with said source, means for deriving a voltage wave having a phase with respect to the phase of said alternating voltage which varies with the angle of synchronization of said motor, and means responsive to the phase of said derived voltage wave for controlling the amplitude of the fundamental frequency component of said source.

References Cited in the file of this patent

UNITED STATES PATENTS

| | | |
|---|---|---|
| 2,319,789 | Chambers | May 25, 1943 |
| 2,402,055 | Kibler | June 11, 1946 |
| 2,601,516 | Cray | June 24, 1952 |
| 2,618,701 | Christensen | Nov. 18, 1952 |
| 2,628,279 | Roe | Feb. 10, 1953 |
| 2,634,388 | Harshbarger | Apr. 7, 1953 |